US008297519B2

(12) United States Patent
Tiedmann

(10) Patent No.: US 8,297,519 B2
(45) Date of Patent: Oct. 30, 2012

(54) PRIVACY PROTECTION PACKET FOR HOLDING FREE FLOATING SECURITY DEVICES WITH DEACTIVATION ASSISTED BY PERFORATIONS IN THE PACKET ONLY

(75) Inventor: Heiko Tiedmann, Dachau (DE)

(73) Assignee: Avery Dennison Corporation, Pasadena, CA (US)

( * ) Notice: Subject to any disclaimer, the term of this patent is extended or adjusted under 35 U.S.C. 154(b) by 0 days.

(21) Appl. No.: 13/205,597

(22) Filed: Aug. 8, 2011

(65) Prior Publication Data

US 2012/0031980 A1 Feb. 9, 2012

Related U.S. Application Data

(60) Provisional application No. 61/371,310, filed on Aug. 6, 2010.

(51) Int. Cl.
*G06K 19/06* (2006.01)
*G08B 13/14* (2006.01)

(52) U.S. Cl. ..................................... 235/492; 340/572.3

(58) Field of Classification Search .................. 235/492; 340/572.3

See application file for complete search history.

(56) References Cited

U.S. PATENT DOCUMENTS 4,876,555 A 10/1989 Jorgensen
5,012,225 A 4/1991 Gill
5,442,334 A 8/1995 Gallo et al.
5,510,770 A 4/1996 Rhoads
5,574,431 A 11/1996 McKeown et al.
5,861,809 A 1/1999 Eckstein et al.
6,181,248 B1 1/2001 Fockens
6,285,284 B1 9/2001 Soe et al.
6,304,182 B1 10/2001 Mori et al.
7,247,214 B2 7/2007 Chamandy et al.
7,277,016 B2 10/2007 Moskowitz et al.
7,375,635 B2 5/2008 Kessler et al.

(Continued)

FOREIGN PATENT DOCUMENTS

AU 696391 9/1998

(Continued)

OTHER PUBLICATIONS

International Search Report dated Nov. 17, 2011 for International Application No. PCT/US2011/046979 filed Aug. 8, 2011. Written Opinion dated Nov. 17, 2011 for International Application No. PCT/US2011/046979 filed Aug. 8, 2011.

Footwear Source Tagging Guidelines, Checkpoint Systems Inc., 2009.

(Continued)

*Primary Examiner* — Thien M Le
*Assistant Examiner* — Toan Ly
(74) *Attorney, Agent, or Firm* — Avery Dennison Corporation

(57) ABSTRACT

The present invention relates to a flexible packaging arrangement for use with security devices. The flexible packaging may include an packet or sleeve in which a plurality of overlapping perforations or cuts may be used to break or render the security device inoperable after repeated bends or application of force to the flexible package to thereby protect the privacy of the consumer and to prevent inadvertent triggering of an alarm system after a legitimate purchase of the device.

25 Claims, 3 Drawing Sheets

U.S. PATENT DOCUMENTS

| | | | | |
|---|---|---|---|---|
| 2006/0220789 | A1* | 10/2006 | Suzuki et al. | 340/10.1 |
| 2007/0146140 | A1* | 6/2007 | Nagao et al. | 340/572.8 |
| 2008/0168936 | A1 | 7/2008 | Rossi | |
| 2009/0027206 | A1* | 1/2009 | Chang et al. | 340/572.3 |
| 2009/0115615 | A1* | 5/2009 | Bleckmann et al. | 340/572.8 |
| 2009/0251320 | A1 | 10/2009 | Jin-Ke | |
| 2009/0302111 | A1* | 12/2009 | Woodard et al. | 235/449 |
| 2010/0177993 | A1 | 7/2010 | Chen | |

FOREIGN PATENT DOCUMENTS

| | | |
|---|---|---|
| CH | 656472 | 6/1986 |
| DE | 9308632 | 11/1994 |
| EP | 0692774 | 1/1996 |
| EP | 0715047 | 6/1996 |
| EP | 762353 | 3/1997 |
| EP | 1270430 | 1/2003 |

* cited by examiner

PRIVACY PROTECTION PACKET FOR HOLDING FREE FLOATING SECURITY DEVICES WITH DEACTIVATION ASSISTED BY PERFORATIONS IN THE PACKET ONLY

FIELD OF THE INVENTION

The present invention is directed to a flexible package, more particularly a packet, sleeve or other flexible housing for holding security devices, such as anti-theft devices and securing such devices to an article of commerce. The packet is intended to protect the privacy of the consumer by allowing breakage of the security device through the application of stresses to the package.

BACKGROUND OF THE INVENTION

Security devices are becoming commonplace in today's market place and are regularly used for preventing theft of consumer products ranging from food stuffs, to apparel and accessories. While retailers have adopted the use of such devices to curtail shoplifting, privacy concerns have arisen which has created a need to deactivate the security device and prevent the device from setting off an alarm after the article of commerce has been the subject of a bona fide purchase.

There are multiple types of security devices currently in use today for preventing the theft of consumer goods. These include electronic article security/surveillance ("EAS") devices which may have a resonating member, such as a magnet to radio frequency ("RE") devices which are read or activated through the receipt of a radio signal at a particular frequency.

Exemplary prior art devices have been created in which a portion of the security tag is severed or removed from the remainder of the device so as to render the device inoperable. For example, U.S. Pat. No. 4,876,555 provides a hole or perforation in the circuit assembly as a method of short circuiting the device. Swiss patent 656,472 provides a perforation line through a security device circuit such that when the security device is torn along the line of perforation, a portion of the circuit is removed from the device the operating frequency of the device is changed, however, the device may still be detected at another frequency. U.S. Pat. No. 5,574,431 provides a line of perforation through a portion of the circuit such that when stress is applied, the circuit breaks. U.S. Pat. No. 7,375,635 is illustrative of a tear strip that is used to remove a portion of a security device by pulling and removing the tear strip. Other devices, such as Australian patent 696,391 provide a first and second portion, in which the entire security portion is removed from the first portion and discarded.

Security devices that are integrated with an article of commerce, historically have been a "sewn in" type of tag, one in which during the manufacture of an apparel item, a security tag is sewn or otherwise physically attached to the apparel item, suffer from various drawbacks in that the tag may be inoperable by the time the apparel item is completed due to the subsequent processing steps. For examples, "stone washed" jeans undergo a washing process to create the particular look and feel to the jeans. This process however, destroys the security tag that has been affixed to the jeans during the manufacturing process. Other processing or treatment steps that may be used in creating or finishing a garment or apparel item can also cause the tag to be destroyed.

Another problem that is present in today's security tag situations includes those integrated tags which are not rendered inoperable at the point of purchase and are still functioning after the consumer leaves the retail location with the garment or other apparel item. If the item is a garment, and the consumer begins wearing the garment and visits a retail establishment with a security system, the garment with the still active security device can activate the security system causing unwanted embarrassment to the consumer.

While many of the foregoing solutions are effective for their intended purpose, a more flexible solution is needed particularly where multiple or different types of security devices may be needed or used by a retailer at a particular location. In addition, a device is required which can provide the security necessary for retailers yet protect the privacy of the individual after the item has been purchased by a consumer.

BRIEF SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

A flexible package or packet for use with a security device is presented. The package may take the form of a packet having a packet sufficiently sized to accept either all of the security device or substantially all of the device. The package is designed so as to be able to break the security device through a series of cuts or perforation with or without a breaking device as will be described herein, which will cause the security device to be rendered inoperable thereby protecting the privacy of the consumer and the possible embarrassment of the consumer walking into a retail establishment and setting off an alarm as the security device is still active.

In one exemplary embodiment, a flexible package for a security device is provided and includes a first substrate that has first and second longitudinal edges, first and second transverse edges, first and second faces and a first size. A second substrate is provided that has first and second longitudinal edges, first and second transverse edges, first and second faces and a second size. A security device is included that has an antenna coil and has first and second sides and is of a size that is less than each of the first and second sizes. The first and second substrates overlying one another and are joined to one another along at least one of each of the first and second longitudinal edges and first and second transverse edges with the security device being disposed between the first and second substrates. Each of the first and second substrates have a plurality of perforation lines or cuts extending through the substrates and overlapping at least a portion of one another and the lines of perforations or cuts extending over at least a portion of the antenna coil.

In a further exemplary embodiment of the presently described invention, packet for containing a security device is described and includes first and second panels joined along three edges to form an opening to create a packet. A security device that is sized and configured to fit substantially within the packet is provided. The security device is not attached to either of the first and second panels and is free floating within the packet. A series of lines of weakness extends through each of the first and second panels and are overlapping at least a portion of one another. The lines of weakness overlap at least a portion of the security device when the security device is in the packet. The lines of weakness do not extend into the security device.

In a yet still further exemplary embodiment of the presently described invention, flexible package for holding a RF security device is provided and includes first and second panels that are joined along three edges to form an opening to create a packet. The packet is sized and configured to hold a RF security device such that the security device fits substantially within the packet. The security device is not attached to either of the first and second panels and is free floating within the packet. A series of lines of perforation or cuts extend through each of the first and second panels and are overlapping at least a portion of one another, the lines of perforations overlapping at least a portion of the security device when the security device is in the packet. The lines of perforations or cuts do not extend into the security device.

In a still further exemplary embodiment of the presently described invention, a web of packet assemblies for use in holding a security device is described and includes a web that has first and second faces and first and second longitudinal edges, with each of the first and second edges joined to one another. A plurality of packet assemblies equally spaced along the web, with each of the assemblies having an open end to form a packet that is sized and configured to accept a security device. A series of lines of perforations extending through each of the first and second faces and aligned with one another, the series of lines of perforations have a series of cuts of about 0.5 mm and a series of ties of about 0.55 mm positioned so as to extend over a portion of the security device when the device is placed within one of the packet assemblies.

Other features and advantages of the present invention will become apparent to those skilled in the art from the following detailed description. It is to be understood, however, that the detailed description of the various embodiments and specific examples, while indicating preferred and other embodiments of the present invention, are given by way of illustration and not limitation. Many changes and modifications within the scope of the present invention may be made without departing from the spirit thereof, and the invention includes all such modifications.

BRIEF DESCRIPTION OF THE DRAWINGS

These, as well as other objects and advantages of this invention, will be more completely understood and appreciated by referring to the following more detailed description of the presently preferred exemplary embodiments of the invention in conjunction with the accompanying drawings, of which.

DETAILED DESCRIPTION OF THE INVENTION

The apparatuses and methods disclosed in this document are described in detail by way of examples and with reference to the figures. Unless otherwise specified, like numbers in the figures indicate references to the same, similar, or corresponding elements throughout the figures. It will be appreciated that modifications to disclosed and described examples, arrangements, configurations, components, elements, apparatuses, methods, materials, etc. can be made and may be desired for a specific application. In this disclosure, any identification of specific shapes, materials, techniques, arrangements, etc. are either related to a specific example presented or are merely a general description of such a shape, material, technique, arrangement, etc. Identifications of specific details or examples are not intended to be, and should not be, construed as mandatory or limiting unless specifically designated as such. Selected examples of apparatuses and methods are hereinafter disclosed and described in detail with reference made to figures.

As used herein the term "Security Devices" includes EAS devices as well as radio frequency identification ("RFID") devices that are used for security and/or inventory tracking or the like.

The flexible package of the presently described invention, which can take the form of a packet, envelope, sleeve, carrier or the like, is designed to hold a security device, such as a RF or AM (accusto magnetic) security device. The package is then intended to be attached to an article such as an apparel item, after the apparel item has been finished, that is the processing or assembly of the garment is completed, in which the package is directly attached or inserted. If the packet is inserted it can be positioned within an existing pocket or other area of the garment. Alternatively, the package can form part of a hang tag which is then connected to the consumer good via a string or other fastener. The package may be made from any flexible material, such as plastic, paper or other composites. The security device is intended to be inserted in a pocket created in the flexible material or packet and is at least substantially enclosed in the pocket and more preferably entirely enclosed within the pocket.

Figure 1:
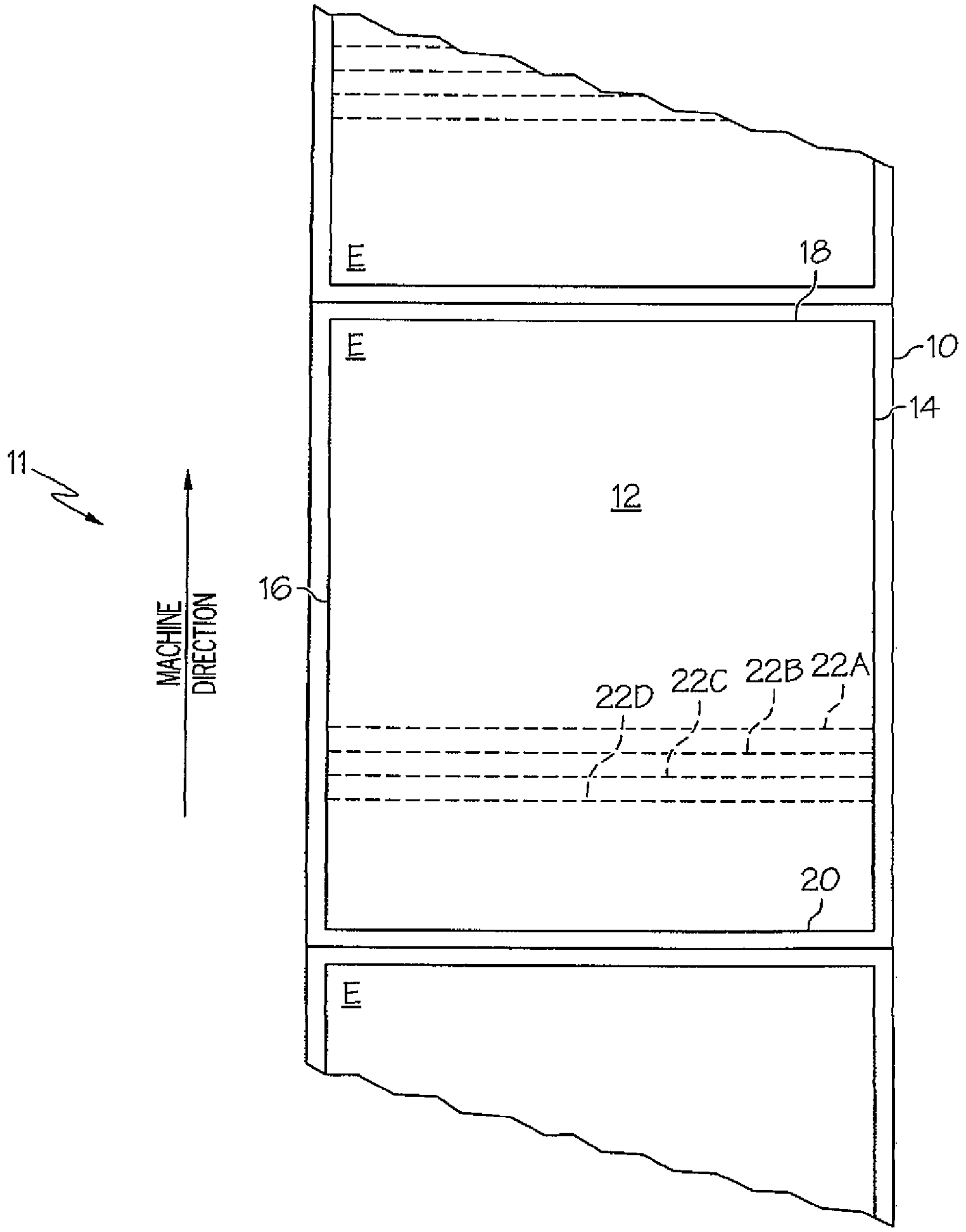
FIG. 1 depicts a front elevation view of a web of packet assemblies to be used in holding security devices in accordance with one embodiment of the presently described invention.

Reference is now directed to FIG. 1, which a web, generally designated by the reference numeral 10 is shown. The web 10 is processed in a machine direction which is shown by arrow 11. The web 10 includes a plurality of packet or other package assemblies each designated by the letter "E". Each of the packet assemblies "E" has a first face 12 and a second face (not shown in FIG. 1) which is opposite the first face 12. The first and second faces of the packet assembly is bounded by first and second longitudinal sides 14 and 16, respectively, and first and second transverse edges 18 and 20, respectively. Each of the packet assemblies are sealed along three edges, first and second longitudinal edges 14 and 16 and second transverse edge 20. This creates an opening along first transverse edge 18. The opening is preferably of a sufficient size so as to allow a security device to be inserted through the opening into the interior of the packet assembly.

Each of the first and second sides of the packet assembly, specifically the those sides that will become the interior of the assembly may have a coating of a pressure sensitive adhesive to firmly hold or bond the inlay or security device, once inserted in position so that the inlay or security device does not move from position once inserted. The adhesive may be a permanent pressure sensitive adhesive or have a light tack adhesive sufficient enough to hold the inlay or security device but not strong enough to necessarily retain the inlay or security device if deliberate attempts are made to remove the inlay or security device. The adhesive, if provided is entirely within the interior of the packet or sleeve and there is no adhesive on the exterior of the packet so that the packet can be inserted into an opening of an apparel item, such as a pocket in a shirt or pants.

Each of the first 12 and second sides of the packet assembly is provided with a plurality of lines of weakness such as a series of cuts or perforation lines, designated by 22*a*, 22*b*, 22*c* and 22*d*. The perforation or cut lines are shown as running perpendicular to the machine direction 11, but it should be understood that the perforation lines may also run parallel to the machine direction. The perforations are made up of a series of cuts of about 0.5 mm and a series of ties of about 0.55 mm. The ties and cuts of the lines of perforation 22*a*, 22*b*, 22*c* and 22*d* are selected so as to break or fracture after repeated bending or the application of forces so that the lines of perforations will break and will no longer protect the security device that is enclosed in the packet which will also then break due to the forces.

The lines of weakness are provided over an area of the security device in amount ranging from about 10 to 30 percent of the area of the security device and more preferably to about 20 to about 25 percent of the area of the security device. In this manner, sufficient breakage can occur of the circuit so as to disable the circuit thereby making it inoperable.

The lines of weakness (e.g. perforations or cuts) are shown extending between the longitudinal sides of the assembly, but may also run between the transverse edges of the assembly depending on the preferences of the retailer or equipment layout. The perforation or cut lines may also run diagonally across the face of the packet assembly. FIG. 1 also shows four lines of weakness (e.g. perforations, cuts, score lines), but there may be additional lines of perforations, cuts or score lines or fewer lines of perforations, cuts or score lines, however for the present invention when a perforation or cut line is used, a cut/tie size it has been found that four lines provide sufficient strength for the assembly and allow breakage of the device when required. A sufficient amount of coverage of the lines of weakness, such as about 20 to about 25 percent, covers over the circuit.

Figure 2:
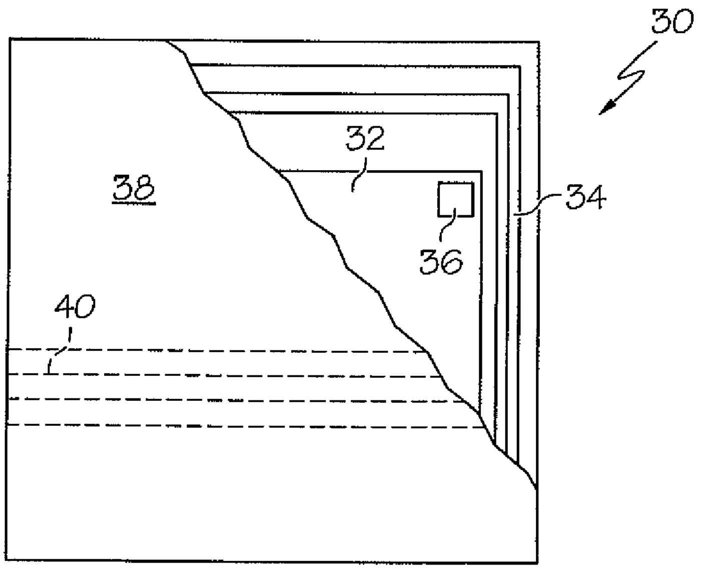
FIG. 2 shows a cut away of an packet assembly with a security device contained within the packet package.

References is now directed to FIG. 2 which shows a cut away of one of the packet assemblies generally designated by reference numeral 30, with a RF security device 32 shown enclosed within the assembly. The security device 32 has a coil or antenna 34 and circuit 36. FIG. 2 shows the plurality of lines of weakness 40 in the front or first face 38 but the lines of weakness 40 do not extend into the security device 32. Each of the packet assemblies has a roughly square dimension of about 40 mm by about 40 mm. It should however be understood that other geometric shapes or configurations may be used depending on the end use of the device.

While FIG. 2 shows the lines of weakness disposed close to a lower end edge (transverse edge) of the packet assembly, it should be understood that the lines of weakness may be centrally disposed over the circuit or closer to the upper transverse edge or adjacent to one of the upper or lower transverse edges, or longitudinal sides or spaced from the longitudinal sides.

Figure 3:
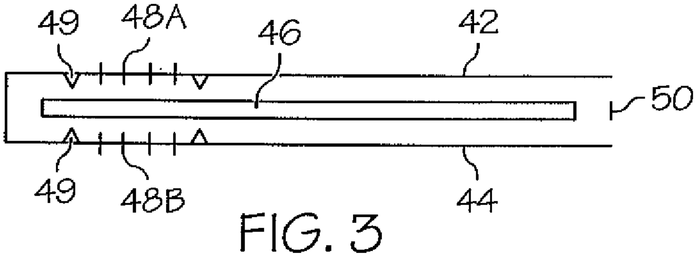
FIG. 3 provides a cut away of a side elevation of the presently described invention and which includes a breaking device disposed internally of the packet.

FIG. 3 illustrates a side view of an packet assembly of the present invention showing the first and second sides 42 and 44 and the security device 46 enclosed within the interior of the packet assembly through the opening 50. The lines of weakness 48*a* and 48*b* are shown extending through each of the first and second faces but the lines of weakness are not in the substrate of the security device 46.

FIG. 3 also shows that the security device is not attached to either of the first or second faces of the packet assembly and that the security device is essentially free floating within the cavity or interior space created in the assembly In an alternate embodiment also shown in drawing FIG. 3, cutting teeth, breaking device or other rigid protrusions 49 can be provided on the interior of the first and second faces and can be brought into contact with the security device to aid in making the device inoperable. The breaking device 49 can also be provided on the exterior of the packet assembly or can be provided as a separate element at least partially overlapping the lines of weakness to facilitate the breaking of the security device to thereby render the security device inoperable.

The breakage device 49 as shown in FIG. 3 may or may not occupy the same amount of coverage space over the security device as the lines of weakness. That is, if the lines of weakness cover about 25% of the security device, the breakage device can occupy the same 25%, less than 25% or more than 25% depending on the requirements of the application and the end user specification.

Figure 4:
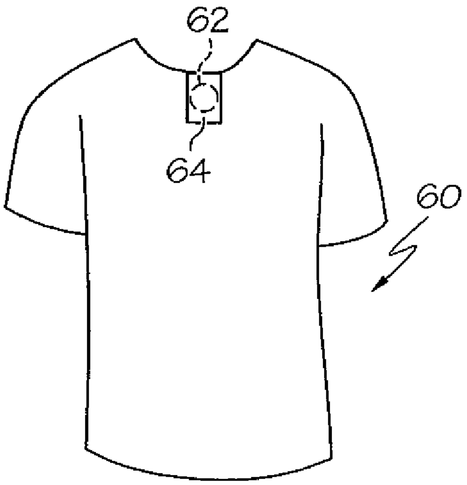
FIG. 4 illustrates the packet assembly of the present invention attached to a consumer article.

FIG. 4 shows an exemplary use of the present invention in which an packet 62 with a security device 64 enclosed in the packet is attached to a consumer good 60, such as an apparel item. In use, the retailer or customer would flex the packet assembly back and forth causing the lines of weakness to break and using a breaking device if one is provided to create a break in the coil or circuit of the security device so that it no longer functions so that the security device is rendered inoperable and will no longer trigger a security system at a retail establishment.

Figure 5:
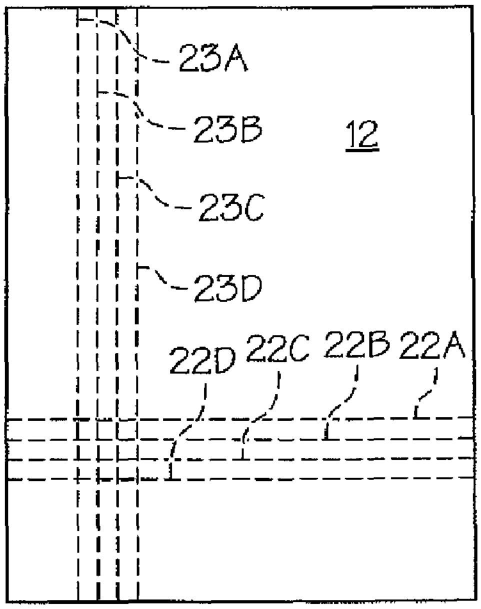
FIG. 5 depicts an alternate arrangement of the lines of perforation.

Reference is now directed to FIG. 5 which shows an alternate embodiment of the current invention. In FIG. 5, an additional plurality of lines of weakness, such as perforations is added to at least one of the substrate sides. First side 12 has a first set of lines of weakness designated by 22*a*, 22*b*, 22*c*, and 22*d* and second set of lines of weakness designated by 23*a*, 23*b*, 23*c*, and 23*d*. In FIG. 5 the first set of lines of weakness is perpendicular to the machine direction and the second set of lines of weakness is parallel to the machine direction, but it should be understood that alternate sets of directions of the lines of weakness, such as diagonal, zig-zag, nominally offset from parallel or perpendicular to the machine direction are also possible. The term, nominally offset from parallel or perpendicular can refer to slightly offset to more substantive deviation from parallel or perpendicular.

Figure 6:
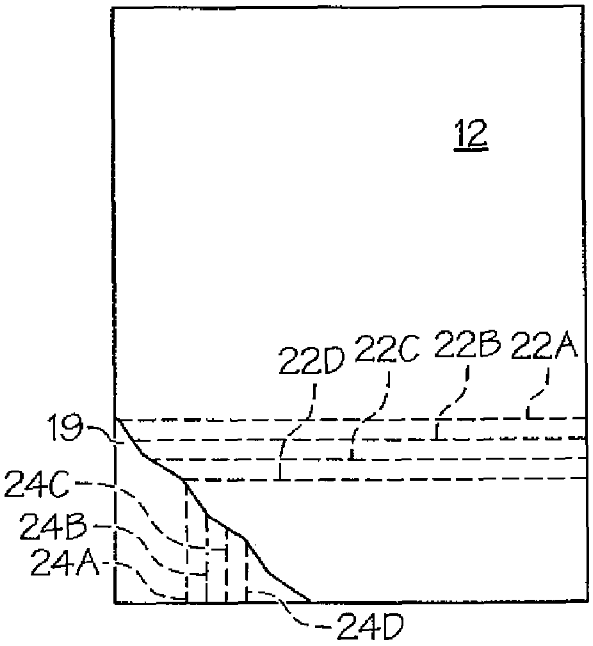
FIG. 6 shows a still further arrangement of the lines of perforation.

Reference now is directed to FIG. 6 which shows an alternate embodiment of the current invention. In FIG. 6, the plurality of lines of weakness that run in varying directions between the substrates. First side 12 has a plurality of lines of weakness designated by 22*a*, 22*b*, 22*c*, and 22*d*. Second side 19 has a plurality of lines of weakness designated by 24*a*, 24*b*, 24*c*, and 24*d*. The plurality of lines of weakness are designed so that there is at least a portion of overlap between the plurality of lines of weakness on the first side 12 and the second side 19 of the packet. Although not shown in the FIGURE, the security device is enclosed between sides 12 and 19. In FIG. 6 the set of lines of weakness on the first side 12 are perpendicular to the machine direction and the set of lines of weakness on the second side 19 are parallel to the machine direction, but it should be understood that alternate sets of directions of the lines of weakness are also possible.

It will thus be seen according to the present invention a highly advantageous flexible packaging for a security device has been provided. While the invention has been described in connection with what is presently considered to be the most practical and preferred embodiment, it will be apparent to those of ordinary skill in the art that the invention is not to be limited to the disclosed embodiment, and that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

What is claimed is:

1. A flexible package for a security device, comprising:

a first substrate having first and second longitudinal edges, first and second transverse edges, first and second faces and a first size;

a second substrate having first and second longitudinal edges, first and second transverse edges, first and second faces and a second size;

a security device having an antenna coil and having first and second sides and having a size that is less than each of the first and second sizes;

the first and second substrates overlying one another and joined to one another along at least one of each of the first and second longitudinal edges and first and second transverse edges with the security device disposed between the first and second substrates;

wherein each of the first and second substrates having a plurality of perforations or cut lines extending through the substrates and overlapping at least a portion of one another and the lines of perforations or cuts extending over at least a portion of the antenna coil and wherein the plurality of perforations or cut lines do not extend into the security device.

2. A flexible package as recited in claim 1, wherein the plurality of perforations extend between the first and second longitudinal edges of each of the first and second substrates.

3. A flexible package as recited in claim 1, wherein the plurality of perforations extend between the first and second transverse edges of each of the first and second substrates.

4. A flexible package as recited in claim 1, wherein the plurality of perforations have a series of cuts of about 0.5 mm and a series of ties of about 0.55 mm.

5. A flexible package as recited in claim 1, wherein the plurality of perforations include four lines of perforations.

6. A flexible package as recited in claim 1, wherein the plurality of perforations run perpendicular to a machine direction.

7. A flexible package as recited in claim 1, wherein the plurality of perforations run parallel to a machine direction.

8. A flexible package as recited in claim 1, wherein the plurality of perforations on the first and second substrate are in alignment.

9. A flexible package as recited in claim 1, wherein the first and second substrates are paper.

10. A flexible package as recited in claim 1, wherein the security device is not attached to either of the first and second substrates.

11. A flexible packet as recited in claim 1, wherein a pressure-sensitive adhesive affixes the security device between the first and second substrates.

12. An packet for containing a security device, comprising:

first and second panels joined along three edges to form an opening to create a packet;

a security device sized and configured to fit substantially within the packet, the security device is not attached to either of the first and second panels and is free floating within the packet; and a series of lines of weakness extending through each of the first and second panels and overlapping at least a portion of one another, the lines of weakness overlapping at least a portion of the security device when the security device is in the packet, the lines of weakness do not extend into the security device.

13. A packet as recited in claim 10, wherein the packet is formed from paper having an adhesive.

14. A packet as recited in claim 10, wherein the lines of weakness have a series of cuts of about 0.5 mm and a series of ties of about 0.55 mm.

15. A packet as recited in claim 10, wherein the security device is an RF device.

16. A packet as recited in claim 10, wherein the security device is a EAS device.

17. A packet as recited in claim 10, wherein the series of lines of weakness on each of the first and second panels are in alignment.

18. A flexible package for holding a RF security device, comprising:

first and second panels joined along three edges to form an opening to create a packet;

the packet sized and configured to hold a RF security device such that the security device fits substantially within the packet, the security device is not attached to either of the first and second panels and is free floating within the packet; and a series of lines of perforation or cuts extending through each of the first and second panels and overlapping at least a portion of one another, the lines of perforations or cuts overlapping at least a portion of the security device when the security device is in the packet, the lines of perforations or cuts do not extend into the security device.

19. A flexible package as recited in claim 18, wherein the lines of perforations or cuts have a series of cuts of about 0.5 mm and a series of ties of about 0.55 mm.

20. A flexible package as recited in claim 18, wherein the packet is produced in a continuous form.

21. A flexible package as recited in claim 18, wherein the packet is produced from paper.

22. A flexible package as recited in claim 18, wherein the packet as a dimension of approximately 40 mm by 40 mm.

23. A flexible package as recited in claim 18, wherein the packet is attached to an article of commerce.

24. A flexible package as recited in claim 18, wherein the series of lines of perforation on each of the first and second panels are in alignment.

25. A web of packet assemblies for a flexible a security device, comprising:

a web;

a plurality of packet assemblies equally spaced along the web, each of the packet assemblies having first and second faces, first and second longitudinal sides, and first and second transverse edges, and with the packet sealed along the longitudinal sides and the second transverse edge;

a security device disposed between the first and second faces of the packet assembly; and a series of lines of weakness extending through each of the first and second faces and aligned with one another, the series of lines of weakness have a series of cuts of about 0.5 mm and a series of ties of about 0.55 mm positioned so as to extend over a portion of the security device and wherein the series of lines of weakness do not extend into the security device.

* * * * *